US008767568B2

(12) United States Patent
Serrano Solsona et al.

(10) Patent No.: US 8,767,568 B2
(45) Date of Patent: Jul. 1, 2014

(54) SCHEDULING TRAFFIC IN A COMMUNICATION CHANNEL

(75) Inventors: Clara Serrano Solsona, Madrid (ES); Beatriz Garriga Muñiz, Madrid (ES); Francisco Javier Dominguez Romero, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 263 days.

(21) Appl. No.: 12/814,879

(22) Filed: Jun. 14, 2010

(65) Prior Publication Data

US 2011/0019563 A1    Jan. 27, 2011

(30) Foreign Application Priority Data

Jun. 12, 2009    (ES) ................................. 200930300

(51) Int. Cl.
*H04L 12/26*    (2006.01)

(52) U.S. Cl.
USPC .......... 370/252; 370/329; 370/232; 370/235; 370/338; 709/232; 709/224; 709/246

(58) Field of Classification Search
USPC ............ 370/252, 329, 230, 232, 235, 395.21, 370/236, 338, 412, 328; 709/232, 224, 246; 710/29, 52, 39
See application file for complete search history.

(56) References Cited

U.S. PATENT DOCUMENTS

| | | | |
|---|---|---|---|
| 6,628,668 B1 * | 9/2003 | Hutzli et al. | 370/468 |
| 6,957,267 B2 * | 10/2005 | Awasthi | 709/232 |
| 7,613,153 B2 * | 11/2009 | Chandra et al. | 370/338 |
| 8,014,674 B2 * | 9/2011 | Gao et al. | 398/72 |
| 8,031,607 B2 * | 10/2011 | Rochon et al. | 370/235 |
| 8,072,887 B1 * | 12/2011 | Siva et al. | 370/236 |
| 2004/0184406 A1 * | 9/2004 | Iwamura | 370/235 |
| 2005/0288050 A1 | 12/2005 | Gill et al. | |
| 2006/0050637 A1 * | 3/2006 | Wigard et al. | 370/230 |
| 2006/0062306 A1 | 3/2006 | Ha et al. | |
| 2006/0114912 A1 * | 6/2006 | Kwan et al. | 370/395.4 |
| 2006/0153216 A1 * | 7/2006 | Hosein et al. | 370/412 |
| 2007/0053290 A1 * | 3/2007 | Michels | 370/230 |

OTHER PUBLICATIONS

Li et al, "Packet-Mode Priority Scheduling for Terabit Core Routers", Jan. 17, 2005, pp. 550-555, vol. 3358/2005, Retreived from Internet URL: http://www.springerlink.com/content/60/t99n284Iryv2ut/fulltext.pdf.

Garriga et al, "QoS Load Differentiation Application in a UTRAN Live Network", Apr. 26, 2009, pp. 1-8, 2009 IEEE 69th Vehicular Technology Conference: Apr. 26-29, 2009 Barcelona, Spain, IEEE, Piscataway, NJ, USA.

(Continued)

*Primary Examiner* — Charles C Jiang
*Assistant Examiner* — Jamal Javaid
(74) *Attorney, Agent, or Firm* — B. Aaron Schulman, Esq.; Nicholas B. Trenkle; Stites & Harbison, PLLC

(57) ABSTRACT

The invention refers to a method for scheduling traffic in a communication channel of a mobile communications network which detects small sized data bursts and prioritizes their transmission. The detection is performed by comparison with two thresholds, one being an indicator of the instantaneous size of the data burst and the second one being related to the size of said data burst along a given period of time.

The invention is also related to a network scheduler comprising means for carrying out the above method.

11 Claims, 3 Drawing Sheets

(56) References Cited

OTHER PUBLICATIONS

Gutierrez, Pablo Jose Ameigeiras, "Packet Scheduling and Quality of Service in HSDPA" Oct. 2003, pp. 1-192, Department of Communication Technology Institute of Electronic Systems, Aalborg University, Retrieved from Internet URL: http://kom.aau.dk/ADM/research/reports/PhDThesis_Pablo_Ameigeiras.pdf.

European Search Reporting dated Jul. 18, 2012 in corresponding European Application No. 10165874.8.

\* cited by examiner

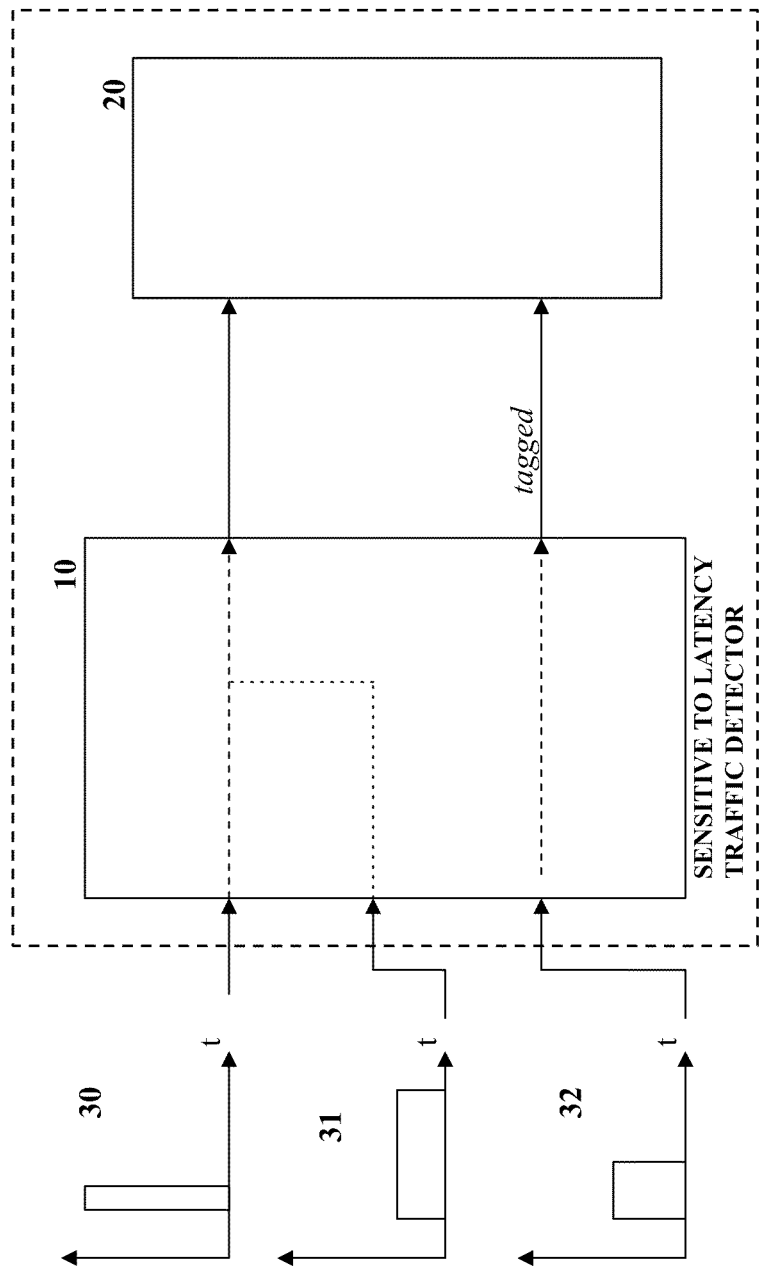

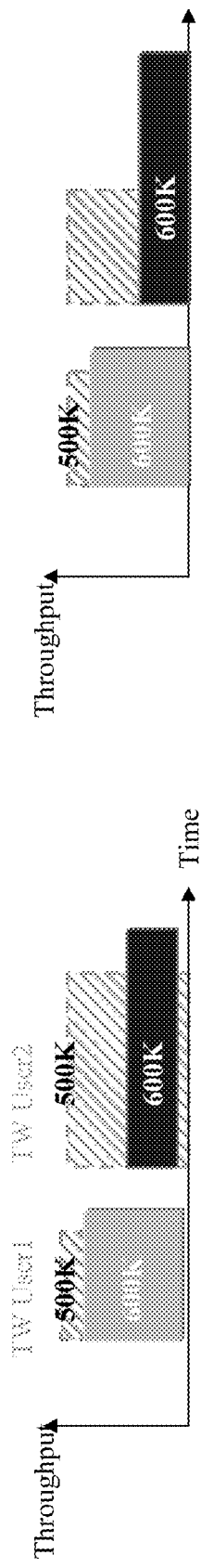
FIG. 2A
FIG. 2B
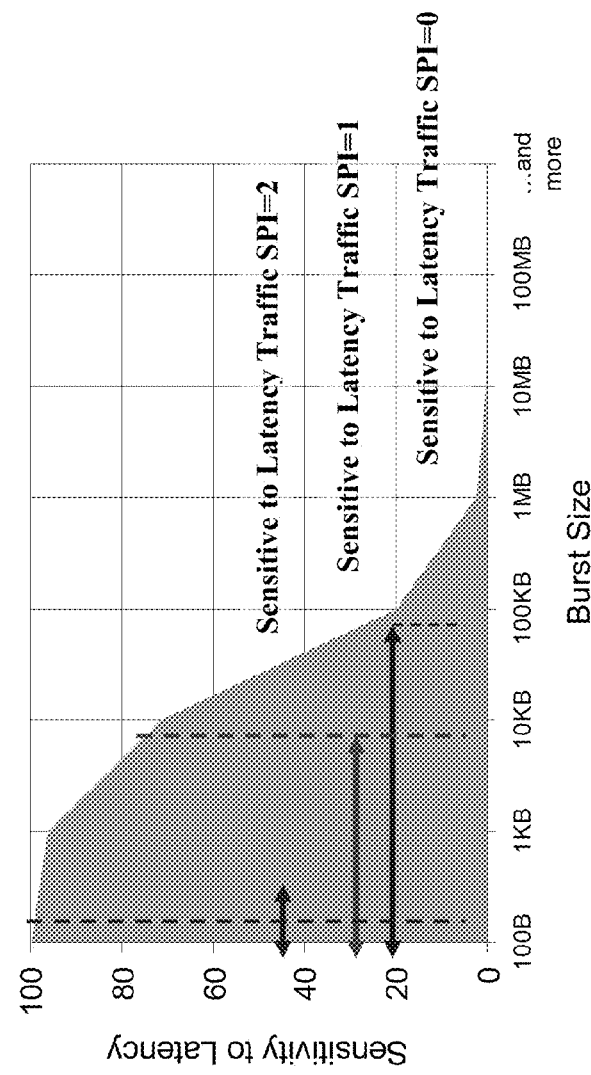
FIG. 3

SCHEDULING TRAFFIC IN A COMMUNICATION CHANNEL

FIELD OF THE INVENTION

The present invention relates to data transfer in a communication system and, more particularly, to a method of scheduling a shared data channel.

BACKGROUND OF THE INVENTION

In modern communication networks, scheduling of shared data channels is a matter of great relevance as it is responsible for the correct distribution of bandwidth among a number of services and communications established upon a channel. This distribution determines the amount of time a packet has to wait on a transmission queue, and thus, the latency suffered in a communication and the quality of the final user experience.

Not all services or traffic types have the same tolerance to latency. Real-time communications usually require lower and more homogeneous latency values, while the transfer of greater amounts of static data allows looser requirements. For this reason, most network architectures provide some kind of system which allows the association of a certain degree of priority to a packet, depending on the type of traffic it carries.

A correct priority allocation, and the consequent priority-dependant handling of data packets, shapes a problem that has been solved to some extent, with different degrees of success, by a number of communication protocols and inventions.

Making use of the means provided by different communication protocol standards, a number of inventions have tried to optimize the performance of the priority allocation system. US 2006/153216-A1 uses information about the current state of the network to generate an adaptive schedule. This way, it reorganizes the priorities of the different packets that are present in the system taking into account the mobile station's scheduling downlink transmission rate and a delay factor that represents the staleness of the queued data. Specifically, this method seeks to improve the quality offered to Voice-over-IP services, although it demands the resources needed to provide a constant supervision of the network state.

US 2005/288050-A1 provides a different approach to the same matter of improving user experience through latency reduction. In this case, it focuses on PTT (Push-to-talk) communications, sending packets belonging to a time-sensitive kind of traffic through a signalling channel.

Differential data handling depending on the kind of carried traffic extends to other communication aspects, such as handover process in cellular networks. An example of traffic-type-dependant hand-over can be found in WO 2006/062306-A1.

However, in all of these documents, the different systems perform a generic characterization of the services that are present on the network. By taking into account only the type of traffic that is being carried, any aspect related to the characteristics of a single communication is ignored. Thus, the scheduling satisfies only partially the communication needs, allowing further improvements of the user experience.

SUMMARY OF THE INVENTION

The invention refers to a method for scheduling traffic in a communication channel, and to a network device of a mobile communications.

The current invention solves the aforementioned problems by detecting and prioritizing, prior to the scheduling of the communication channels, those data bursts which, due to their reduced size, are more sensitive to latency.

With this purpose, the method of the independent claim of the present invention tags as sensitive-to-latency traffic those data bursts which simultaneously verify:

The amount of data added to a transmission queue by said data burst in a given instant, that is, the part of the burst that is sent to the scheduling system at a certain moment in order to be transmitted over the communication channel, is smaller than a given threshold.

The amount of data added to a transmission queue by said data burst during a certain amount of time defined by the length of a time window, is smaller than a given second threshold. Preferably, the length of the window will depend on the throughput of the user which is source or destination of said data burst, in order to perform a more effective classification.

Thus, data bursts with the following characteristics remain untagged:

Data bursts which provide a great amount of data in a given instant.

Data bursts which provide a moderate or great amount of data constantly over a long period of time.

In accordance with one aspect of the invention there is provided a method for scheduling traffic in a communication channel of a mobile communications network, the communication channel being shared by a plurality of user equipments comprising:

tagging as sensitive-to-latency traffic, any data burst which verifies:
   the amount of data from said data burst added to a transmission queue in a given instant, is lower than a first threshold; and
   the amount of data from said data burst added to a transmission queue over the duration of a time window is lower than a second threshold;
prioritizing the transmission of data bursts tagged as sensitive-to-latency traffic.

The length of the time window can be dynamically set for each service user traffic according to the throughput of said user. Each user can establish more than one communication—typically two—, and each communication is computed independently.

The first and second thresholds are preferably set as a function of a priority indicator of the data burst, being said priority indicator dependant of the type of traffic carried by said data burst.

Said priority indicator is preferably an SPI field as defined in the HSPA protocol, TS 25.433.

The step of prioritizing data bursts tagged as sensitive-to-latency traffic is preferably performed by setting a weight which modifies a priority indicator of the data burst, being said priority indicator dependant of the type of traffic carried by said data burst, wherein said weight depends on whether a data burst is tagged as sensitive-to-latency traffic.

Said weight can depend on said priority indicator of the data burst.

Said priority indicator preferably is the SPI field defined in the HSPA protocol and said weight is set in the SPI weight field defined in HSPA protocol.

The step of prioritizing data bursts tagged as sensitive-to-latency traffic is preferably performed by allocating a pre-established bandwidth to the data bursts as long as the data bursts remain tagged as sensitive-to-latency traffic.

The value of said pre-established bandwidth can be dependent on a priority indicator of the data burst, being said priority indicator dependant of the type of traffic carried by said data burst.

With the method of the present invention a complete characterization of the traffic is performed, not only considering the general type of traffic established on a connection, but also an intrinsic characteristic of single data bursts. This allows for a more efficient scheduling of resources in the network, which results in a better user experience.

In accordance with a further aspect of the present invention there is provided a network device of a mobile communications network comprising, at least:

a sensitive-to-latency traffic detector configured to tag data bursts that verify:
the amount of data from said data burst added to a transmission queue in a given instant, is lower than a first threshold;
the amount of data from said data burst added to a transmission queue over the length of a time window is lower than a second threshold; and.
a channel scheduler configured to prioritizes data bursts tagged by the sensitive-to-latency traffic detector.

The advantages of the proposed invention will become apparent in the description that follows.

BRIEF DESCRIPTION OF THE DRAWINGS

To complete the description and in order to provide for a better understanding of the invention, a set of drawings is provided. The drawings form an integral part of the description and illustrate the preferred embodiments of the invention, which should not be interpreted as restricting the scope of the invention, but just as examples of how the invention can be embodied. The drawings comprise the following figures:

FIG. 1 shows a general scheme of the system with examples of the different data bursts it recognizes.

FIGS. 2A and 2B show the effects of the technique used to select the length of time windows.

FIG. 3 shows a theoretical dependence between burst size and sensitivity to latency.

DETAILED DESCRIPTION OF THE PREFERRED EMBODIMENTS

Figure 4:
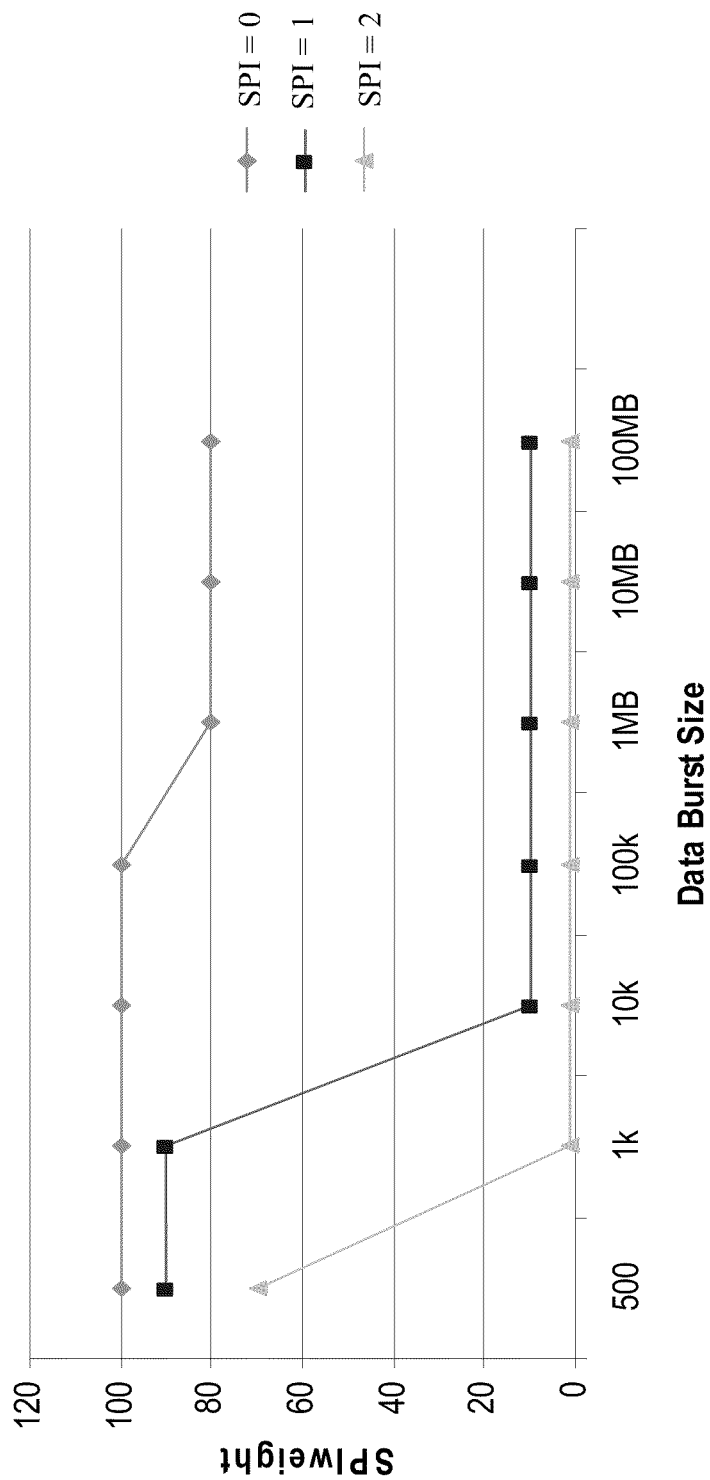
FIG. 4 shows an example of SPI weight evolution versus data burst size.

Reference will now be made in detail to a preferred embodiment of the method of the present invention, which focuses on HSPA technology and makes use of some of the fields it defines, such as SPI or SPI weight. Nevertheless, this embodiment should be considered as a non-limiting explanatory example, as it could be extended to any other network architecture able to provide valid equivalents for the required functionalities.

FIG. 1 shows a general scheme of the system, wherein the two main tasks of the method have been assigned to two functional blocks: a sensitive-to-latency traffic detector 10 and a network scheduler 20. It also shows different kinds of data bursts entering the system.

In order to detect data bursts which are sensitive to latency, two situations must be discarded:
Instantaneous big data bursts, with a high data rate 30).
Big data bursts with a smaller data rate but with a greater length 31.

In order to perform the first detection, a first threshold is set on a buffer that serves as entry point to the transmission queue. This first threshold is called in this example Maximum User Buffer Size (MaxBS), and it is constantly compared to the actual amount of data in said buffer, that is, User Buffer Size (BS). Thus, if a data burst exceeds the MaxBS in a given instant, it will not be considered as sensitive-to-latency traffic.

The second detection needs the computation of the amount of data introduced by a data burst in the system during the length of a given time window. This amount called in this example Cumulative Received Bytes (CRB) is compared to a second threshold, Maximum Cumulative Received Bytes (MaxCRB).

If both conditions are satisfied, that is, if BS<MaxBS and CRB<MaxCRB, the corresponding data burst 32 is tagged as sensitive-to-latency traffic, and a flag is set for that purpose as TRUE. In any other case, the flag remains as FALSE.

A possible way of selecting an appropriate length for the time window (TW) is to apply the following rule:

$$TimeWindow = \frac{MaxCRB}{User\,Throughput}$$

FIGS. 2A and 2B show the performance of this option (dynamic time window TW, shown in FIG. 2A) as opposed to the selection of a static window (FIG. 2B), being Max-CRB=500 KB.

In the case shown in FIG. 2A:

UserThroughput1>UserThroughput2 so applying previous equation:

TimeWindow User1<TimeWindow User2.

So in this first case, with a configurable time window, for both users the traffic is considered as not sensitive to latency traffic, since the burst size 600 KB exceeds the Maximum Burst Size, 500 KB.

In the case shown in FIG. 2B:

UserThroughput1>UserThroughput2 and using the above equation:

TimeWindow User1=TimeWindow User2

In this second case (static window), the time window for the second user (User2) comprises 300 KB, which is less than 500 KB, so the burst is considered as sensitive to latency traffic. But the burst size, 600 KB is bigger than the Maximum burst size (CRB=500 KB), so the time window for the second user (user2) has been erroneously configured.

So, in both cases the user throughput of the second data burst is lower than that of the first data burst, but only the first option (shown in FIG. 2A) takes that fact into account. Thus, the static window (in FIG. 2B) fails to detect the actual size of the second burst and erroneously classifies it as sensitive to latency.

In order to provide the system with greater flexibility, the preferred embodiment imposes different values to MaxCRB and MaxBS according to a previous priority value of the data burst indicated in this case in the SPI field, with values ranging from 0 to 15 (being 0 the highest priority). These values of MaxCRB and MaxBS become stricter as SPI increases.

A free criterion can be used for the choice of the evolution of said values (MaxCRB, MaxBS) along the range of SPI, but it can also be taken into account the theoretical effect that burst size has got on sensitivity to latency. Sensitivity to latency (sensL(%)) can be defined as:

$$sensL(\%) = \frac{L}{ST}$$

where L is the latency between two elements of the network and ST is the average service time, defined as:

$$ST = L + Ttx = L + \frac{A}{Thr}$$

where Ttx is the time of transmission of the data burst, depending on the Throughput (Thr) and the size of the data burst (A).

FIG. 3 shows the resulting relation, computed for typical values of 1 Mbps for Throughput and 100 ms for latency. In the resulting curve of FIG. 3, the following recommended percentage boundaries have been applied to latency sensitivity along the different SPI values, with the following resulting thresholds:

|  | SPI | | | | | |
|---|---|---|---|---|---|---|
|  | 0 | 1 | 2 | ... | 13 | 14 | 15 |
| sensL (%) | >30% | >80% | >90% |  | >100% | >100% | >100% |
| MaxBS | 100 KB | 10 KB | 100 B |  | 0 | 0 | 0 |
| MaxCRB | 100 KB | 10 KB | 100 B |  | 0 | 0 | 0 |

The second step of the method involves performing the actual scheduling by upgrading the priority of those data bursts that have been tagged as sensitive-to-latency.

Two possible embodiments of this second step follow, although any other scheduling that takes into account the previous classification should be valid and should be considered as included in the scope of the present invention.

1.—The first possible solution aims at avoiding ramp-up actions in Users transmitting sensitive to latency traffic, guaranteeing a high initial availability of resources and maintaining it until there no longer is sensitive to latency traffic.

Uplink scheduler: if the sensitive to latency traffic flag is set to TRUE for a user equipment UE, a sustained schedule grant SG/ms is indicated to the UE. The schedule grant SG is maintained until the flag is set to FALSE (one of the two variables exceeds its threshold). The schedule grant SG is configurable per SPI, and the higher the priority the higher the value.

Downlink Scheduler: if the sensitive to latency traffic flag is TRUE for a user equipment UE, a sustained capacity (SC/ms) is indicated to the RNC MAC-d flow, and the capacity allocation is maintained until the flag is set to FALSE (one of the two variables exceeds its threshold). The sustained capacity SC is configurable per SPI, and the higher the priority the higher the value.

So, SC and SG are defined as:
SG[i]=Not guaranteed; if Sensitive to Latency traffic flag=FALSE SG[i]; if Sensitive to Latency traffic flag=TRUE
SC[i]=Not guaranteed; Sensitive to Latency traffic flag=FALSE SC[i]; Sensitive to Latency traffic flag=TRUE where i has 16 values as defined in the standards for the 16 possible SPI values.

The following table shows recommended values for SG[i] and SC [i]:

| SPI | 0 | 1 | 2 |
|---|---|---|---|
| SG/ms (UL) | 1500 kbps/10 ms | 900 kbps/10 ms | 500 kbps/10 ms |
| SC/ms (DL) | 1500 kbps/10 ms | 900 kbps/10 ms | 500 kbps/10 ms |

With this flexibility in the configuration better performance in terms of delay can be provided to higher priority classes. For higher priority classes higher SG/ms and SC/ms can be defined, guaranteeing a higher availability of resources and providing less delay for the sensitive to latency traffic.

2.—HSPA scheduling priority algorithms for a given user comprise the following relations:
for the downlink channel:

$$SchedP = \frac{R(t)}{r(t)} * SPIweight$$

for the uplink channel:

$$Granted\_Rate = Max\_Data\_Rate \times \frac{SPIweight_i}{\sum_i SPIweight_i}$$

where:
R(t) is the instant rate of a User Equipment (UE) which can be reached according to the reported channel quality indicator (CQI) at the scheduling time t;
r(t) is the user scheduling rate in the last T seconds;
SPI weight is the weight of the user taking into account its priority; and
SchedP is the Scheduling priority for Downlink for every user calculated every 2 ms to decide which user data will be transmitted.
Granted_Rate is the user instantaneous rate allocated to every user in the Uplink.
Max_Data_Rate is the maximum possible bandwidth in terms of bit rate for the Uplink.
Thus, the SPIWeight parameter affects the effective priority of a data burst both in the uplink and the downlink channel:
Downlink: the scheduler calculates the different priorities of the packets every 2 ms taking into account the different inputs, and then the HSDPA channel is allocated to the packet with the highest priority (SchedP). If the HSDPA channel allows sending more than one packet per Transmission Time Interval (TTI), then the packet with the next highest priority is chosen.
Usually, the SPIweight is a relative weight between different users, and so a value is given to every SPI parameter (there is a maximum of 16 different SPI values) and it is defined in the 3GPP standards. Every user has an SPI value (from 0 to 16) and for every SPI value there is an SPI weight configured in the RNC.
Uplink: the scheduler allocates on a 10 ms basis, available uplink resources that are not already allocated to DCH (Dedicated Channel) users to E-DCH (Enhanced Dedicated Channel) users when they have data to send. If overload occurs in any of the resources managed by the scheduler (i.e. Uu interface or hardware), the scheduler calculates how much of the resources need to be freed up to resolve the overload situation, sharing the resources among the users.

Making use of the described procedures, the effective priority of data bursts tagged as sensitive-to-latency traffic can be upgraded by choosing a different SPIweight value depending on whether said data burst is tagged. This value depends, preferably, on the SPI value of the data burst, as shown on the following example, containing recommended values for SPI weights:

| SPI | 0 | 1 | 2 | ... |
|---|---|---|---|---|
| SPIweigth for untagged data burst | 80 | 10 | 1 | |
| SPIweigth for tagged data burst | 100 | 90 | 70 | |

FIG. 4 shows a graphical example of the evolution of SPIWeight[i] versus data burst size. As the thresholds are configurable per SPI, for this example, for the highest priority (i=0) data bursts below MaxBS=MaxCBR=100 kbytes have been considered as sensitive to latency traffic, giving them higher SPI weight (100) and therefore lower latency, while for SPI=2 only data bursts below MaxBS=MaxCBR=500 bytes have been considered sensitive to latency traffic (with an SPIweight of 70).

Differentiation in the QoS load provides high priority users with a better performance in terms of delay and not just in bit rate.

The invention is obviously not limited to the specific embodiments described herein, but also encompasses any variations that may be considered by any person skilled in the art (for example, as regards the choice of components, configuration, etc.), within the general scope of the invention as defined in the appended claims.

The invention claimed is:

1. A method for scheduling traffic in a communication channel of a mobile communications network, the communication channel being shared by a plurality of user equipments, the method comprising:
   detecting each intermittent transmission of data that exceeds regular rate of data transfer as a data burst;
   determining whether an amount of data from each detected data burst added to a transmission queue in a given instant is lower than a first threshold;
   determining whether an amount of data from each detected data burst added to the transmission queue over a duration of a time window is lower than a second threshold;
   for each detected data burst, determining that the data burst is sensitive-to-latency traffic in response to determining that the amount of data from the data burst added to the transmission queue in a given instant is lower than the first threshold and determining that the amount of data from the data burst added to the transmission queue over the duration of the time window is lower than the second threshold;
   tagging each data burst determined to be sensitive-to-latency traffic as a sensitive-to-latency traffic data burst; and
   prioritizing transmission of data bursts tagged as sensitive-to-latency traffic data bursts.

2. The method according to claim 1, wherein a length of the time window is dynamically set for each service user traffic according to a throughput of a user for the service user traffic.

3. The method according to claim 1, wherein, for each data burst, the first and second thresholds are set as a function of a priority indicator of the data burst, said priority indicator being dependant on a type of traffic carried by said data burst.

4. The method according to claim 3, wherein said priority indicator of each data burst is a scheduling priority indicator (SPI) field as defined according to High Speed Packet Access (HSPA) protocol.

5. The method according to claim 1, wherein prioritizing transmission of data bursts tagged as sensitive-to-latency traffic is performed, for each data burst, by setting a weight which modifies a priority indicator of the data burst, said priority indicator being dependant on a type of traffic carried by said data burst, wherein said weight depends on whether the data burst is tagged as sensitive-to-latency traffic.

6. The method according to claim 5, wherein said weight depends on said priority indicator of the data burst.

7. The method according to claim 5, wherein said priority indicator is an Scheduling Priority Indicator (SPI) field defined according to High Speed Packet Access (HSPA) protocol and said weight is set in an SPI weight field defined according to HSPA protocol.

8. The method according to claim 1, wherein prioritizing transmission of data bursts tagged as sensitive-to-latency traffic is performed, for each data burst, by allocating a pre-established bandwidth to the data burst as long as the data burst remains tagged as sensitive-to-latency traffic.

9. The method according to claim 8, wherein a value of said pre-established bandwidth depends on a priority indicator of the data burst, said priority indicator being dependant on a type of traffic carried by said data burst.

10. The method according to claim 9, wherein said priority indicator is a Scheduling Priority Indicator (SPI) field as defined according to High Speed Packet Access (HSPA) protocol.

11. A network device for a mobile communications network, the network device comprising:
   a transceiver receiving data traffic transmitted over a communication channel shared by a plurality of user equipments; and
   a traffic controller detecting each intermittent transmission of data received by the transceiver that exceeds a regular rate of data transfer as a data burst, the traffic controller including:
      a sensitive-to-latency traffic detector that determines, for each detected data burst, whether an amount of data from said data burst added to a transmission queue in a given instant is lower than a first threshold, and whether an amount of data from said data burst added to a transmission queue over a duration of a time window is lower than a second threshold, the sensitive-to-latency traffic detector determining, for each detected data burst, that the data burst is sensitive-to-latency traffic in response to determining that the amount of data from the data burst added to the transmission queue in a given instant is lower than the first threshold, and determining that the amount of data from the data burst added to the transmission queue over the duration of the time window is lower than the second threshold, the sensitive-to-latency traffic detector tagging each data burst determined to be sensitive-to-latency traffic as a sensitive-to-latency traffic data burst; and
   a channel scheduler configured to prioritize transmission via the transceiver of data bursts tagged by the sensitive-to-latency traffic detector as sensitive-to-latency traffic data bursts.

* * * * *